(12) United States Patent
Liefer et al.

(10) Patent No.: US 12,343,780 B1
(45) Date of Patent: Jul. 1, 2025

(54) SHEET METAL PROCESSING CELL WITH PART CAPTURE TABLE

(71) Applicant: Red Bud Industries, Inc., Red Bud, IL (US)

(72) Inventors: Kollin N. Liefer, Waterloo, IL (US); Scott McIntyre, Sparta, IL (US); Dean C. Linders, Baldwin, IL (US)

(73) Assignee: Red Bud Industries, Inc., Red Bud, IL (US)

( * ) Notice: Subject to any disclaimer, the term of this patent is extended or adjusted under 35 U.S.C. 154(b) by 163 days.

(21) Appl. No.: 18/195,642

(22) Filed: May 10, 2023

(51) Int. Cl.
    *B21D 43/08* (2006.01)
    *B21D 28/26* (2006.01)
    *B65G 13/00* (2006.01)
    *B65G 57/03* (2006.01)

(52) U.S. Cl.
    CPC ............ *B21D 43/08* (2013.01); *B21D 28/26* (2013.01); *B65G 13/00* (2013.01); *B65G 57/03* (2013.01)

(58) Field of Classification Search
    None
    See application file for complete search history.

(56) References Cited

U.S. PATENT DOCUMENTS

| | | | |
|---|---|---|---|
| 3,712,486 A * | 1/1973 | Lopez | B65H 31/34 271/221 |
| 4,599,025 A * | 7/1986 | Borsuk | B65G 57/06 198/468.9 |
| 4,796,341 A | 1/1989 | Kuhn, II | |
| 4,929,342 A | 5/1990 | Johnston | |
| 5,732,609 A | 3/1998 | Marschke | |
| 7,147,097 B2 | 12/2006 | Lemm | |
| 8,684,296 B2 | 4/2014 | Allerdings | |
| 9,254,512 B2 | 2/2016 | Allerdings | |
| 9,352,927 B2 * | 5/2016 | Salamone | B65H 31/34 |
| 9,878,857 B2 | 1/2018 | Itoh et al. | |
| 10,214,366 B2 * | 2/2019 | Milewski | B65G 15/12 |
| 2016/0101450 A1 | 4/2016 | Linzer et al. | |

FOREIGN PATENT DOCUMENTS

| | | |
|---|---|---|
| KR | 20100011683 A | 2/2010 |
| KR | 20120000999 A | 1/2012 |
| KR | 20120032973 A | 4/2012 |
| KR | 101746981 B1 | 6/2017 |
| KR | 101786253 B1 | 10/2017 |
| KR | 20200017693 A | 2/2020 |

* cited by examiner

*Primary Examiner* — Kavel Singh
(74) *Attorney, Agent, or Firm* — Thompson Coburn LLP

(57) ABSTRACT

A sheet metal processing cell has a stacker with a stack forming portion for receiving a length of sheet metal and positioning the sheet metal to be received in the stack. A part capture table is movable between an inserted position where the part capture table is positionable within the frame of the stacker below the stack forming portion and above the exit conveyor, and a withdrawn area where the part capture table is positioned outside of the frame of the stacker. When the part capture table is in the inserted position, the part capture table can receive a captured length of sheet metal from the stack forming portion and/or transfer the captured length of sheet metal from the part capture table to the stack. The part capture table has a conveyor for conveying the captured length of the sheet metal off the part capture table onto the stack.

20 Claims, 7 Drawing Sheets

SHEET METAL PROCESSING CELL WITH PART CAPTURE TABLE

FIELD OF THE DISCLOSURE

The disclosure is directed to a sheet metal processing cell that has a stacker for forming a stack of sheet metal. The cell may include a traversing part sorter for receiving a diverted length of sheet metal. When provided in the cell, the traversing part sorter is configured to receive the diverted length of sheet metal from the diverter of the stacker and direct the diverted length of sheet metal to a scrap bin and/or a measuring table, as applicable. In addition or alternative, the cell may include a part capture table for receiving a captured length of sheet metal. The captured length of sheet metal may be removed from the stacker, inspected and returned to the stacker.

BACKGROUND AND SUMMARY

When processing coils of sheet metal, for instance, leveling, cutting to length and stacking, there is typically defective material at the leading and trailing edge of the coil. This defective material or scrap must be cut and removed. In addition, during processing, any sheets with visual or dimensional defects that are identified have to be removed from the process. In many instances, operators remove the cut-off scrap pieces by hand. Sometime, this culling procedure requires two people depending upon the weight and size of the scrap piece. In addition, the scrap pieces frequently have to be separated and stacked on individual pallets or skids based on the material type or alloy type associated with the sheet metal being processed. When the processing job on the line changes from one type of material or alloy to another, the skids for the scrap pieces are typically shuffled around the facility and adjacent the processing line. For instance, a fork truck may remove one set of scrap skids from adjacent the processing line, take the skids to a remote area in the facility, and pick up a new set of scrap skids to bring next to the processing line for the new material type or alloy. This can be time consuming, cumbersome, and labor intensive.

As will be discussed in greater detail below, the processing line may be provided with a traversing part sorter for receiving the diverted length of sheet metal, which then may be removed from the processing line and/or measured and/or inspected. The traversing part sorter may be arranged at the end of the stacker and receive a diverted length of sheet metal from the diverter of the stacker. Once the length of sheet metal is diverted onto the traversing part sorter, the traversing part sorter may translate away from the stacker and the diverter, and direct scrap/defective material into one of a plurality of scrap bins, depending upon the level of scrap in the scrap bin and/or material or alloy type. The traversing part sorter may also direct a diverted length of sheet metal with small or close tolerance dimensional requirements to a measuring table adjacent the processing line. The measuring tables are typically capable of measuring very tight tolerances (+/−0.0002). The traversing part sorter may have a conveyor that automatically moves the diverted sheet metal off the edge of the traversing part sorter, for instance, to a scrap bin or selected scrap bin, and/or to the measuring table. So, the measuring table may be on one lateral side of the processing line, and the scrap bin(s) may be on the laterally opposite sides of the processing line. As will become clear from the discussion that follows below, the traversing part sorter eliminates the need to manually handle the scrap and parts for measurement. In addition, it allows the different types of material to be sorted automatically while the processing line is still in operation, for instance, without disruption of the stacking operation.

Also, as will be discussed in greater detail below, the processing line may be provided with a part capture table. When processing large sheets of sheet metal in a cut-to-length type operation, the dimensional tolerances required are typically not as tight as on smaller parts that may be inspected on a part measuring table. Conventionally, larger sheets of sheet metal with wider dimensional tolerance requirements are often measured in the stacker with a tape measure, for instance, measuring the top part in the stack when the stack is positioned on the exit conveyor of the stacker. However, when doing such an measuring operation, the line has to be stopped. In some instances, if the dimensional tolerances required are somewhat tighter than what can be verified with a tape measure, the part has to be manually removed from the stacker (often by two people) and carried over to a dedicated measuring table where it can be measured. Once the part has been measured, it is manually returned to the stack. Again, this typically occurs while the processing line is stopped. When running smaller parts, the traversing part sorter mentioned earlier may be used to convey/direct the part to the measuring table. The traversing part sorter may also be used to convey/divert larger parts to the measuring table. However, in either instance, the parts have to be manually placed back onto the stack typically with the assistance of two people.

The part capture table allows a part to be measured and returned to the stack in an efficient manner that does not involve manual operation. The part capture table is movable between an inserted position and withdrawn area. When the part capture table is in the inserted position, the part capture table is positioned within a frame structure of the stacker below the stack forming portion and movable guide rails of the stacker and above the exit conveyor of the stacker. So, the processing line may be momentarily stopped to allow the part capture table to move to the inserted position. A part in the stack forming portion of the stacker, for instance, a part cut with the shearer, may be allowed to drop onto the part capture table. Upon doing so, the part capture table may be moved to the withdrawn area outside and away from the frame structure of the stacker and the processing line may resume normal stacking operations. In the withdrawn area, the part capture table may be moved to a position where the line operators have clear unimpeded access to the part for measurement and/or general inspection. In this location, the part can be measured with a tape measure, or processed with more advanced machine measuring systems. In the withdrawn area, the part capture table may be moved to a position with a part inverter. While in this position, the part inverter may pick up the part and flip it over for bottom side physical and dimensional inspection. Conventionally, the manual inversion of heavy parts is difficult due to their weight.

Once the measurements/inspection is completed in the withdrawn area, the processing line may be momentarily stopped, and the part capture table may be moved from the withdrawn area to the inserted position. The part capture table may be provided with a conveyor that conveys the part off the part capture table onto the stack. The part capture table may then be moved to the withdrawn area and the processing line may be restarted. The part capture table eliminates manual interaction to retrieve or return a part to the stack, and to measure and/or inspect a part, regardless of its size. Further, the part capture table allows the processing line to remain in operation while inspection occurs.

Additional benefits and features of the traversing part sorter and part capture table are discussed below.

DETAILED DESCRIPTION

Figure 1:
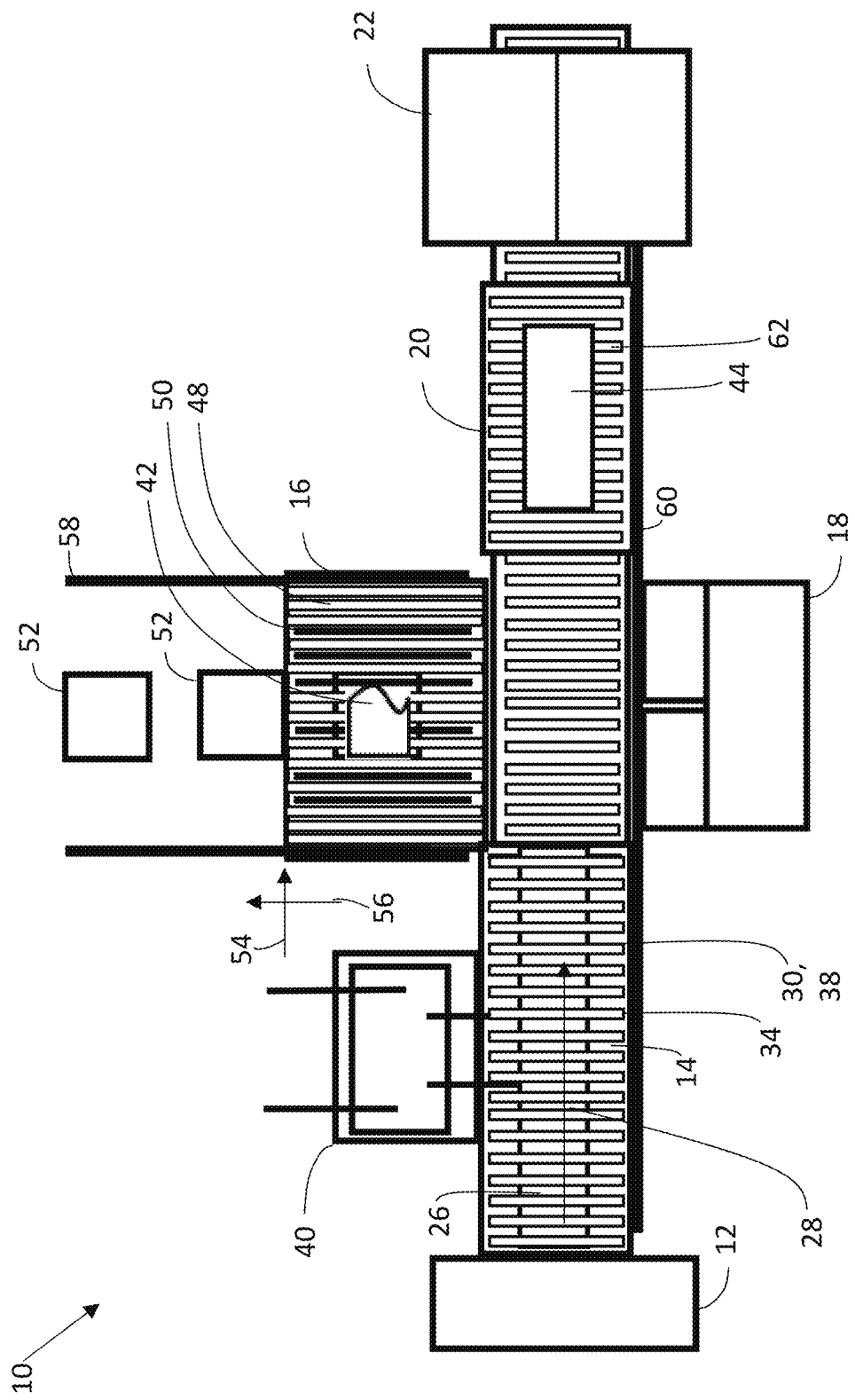
FIG. 1 is a schematic top view of a processing line with a shearer, stacker, traversing part sorter and part capture table.
Figure 2:
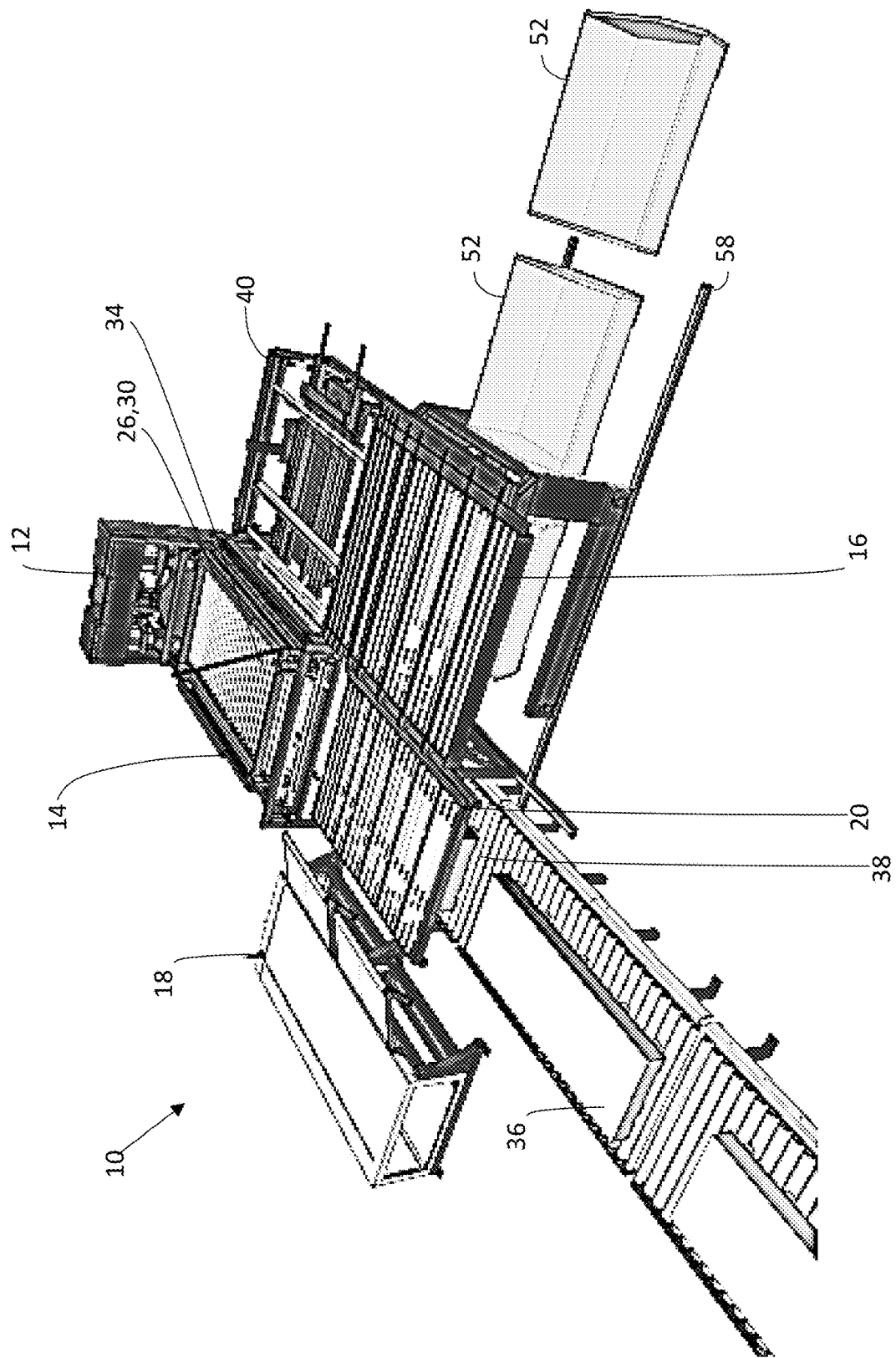
FIGS. 2-4 are alternative perspective views of the processing line of FIG. 1.
Figure 3:
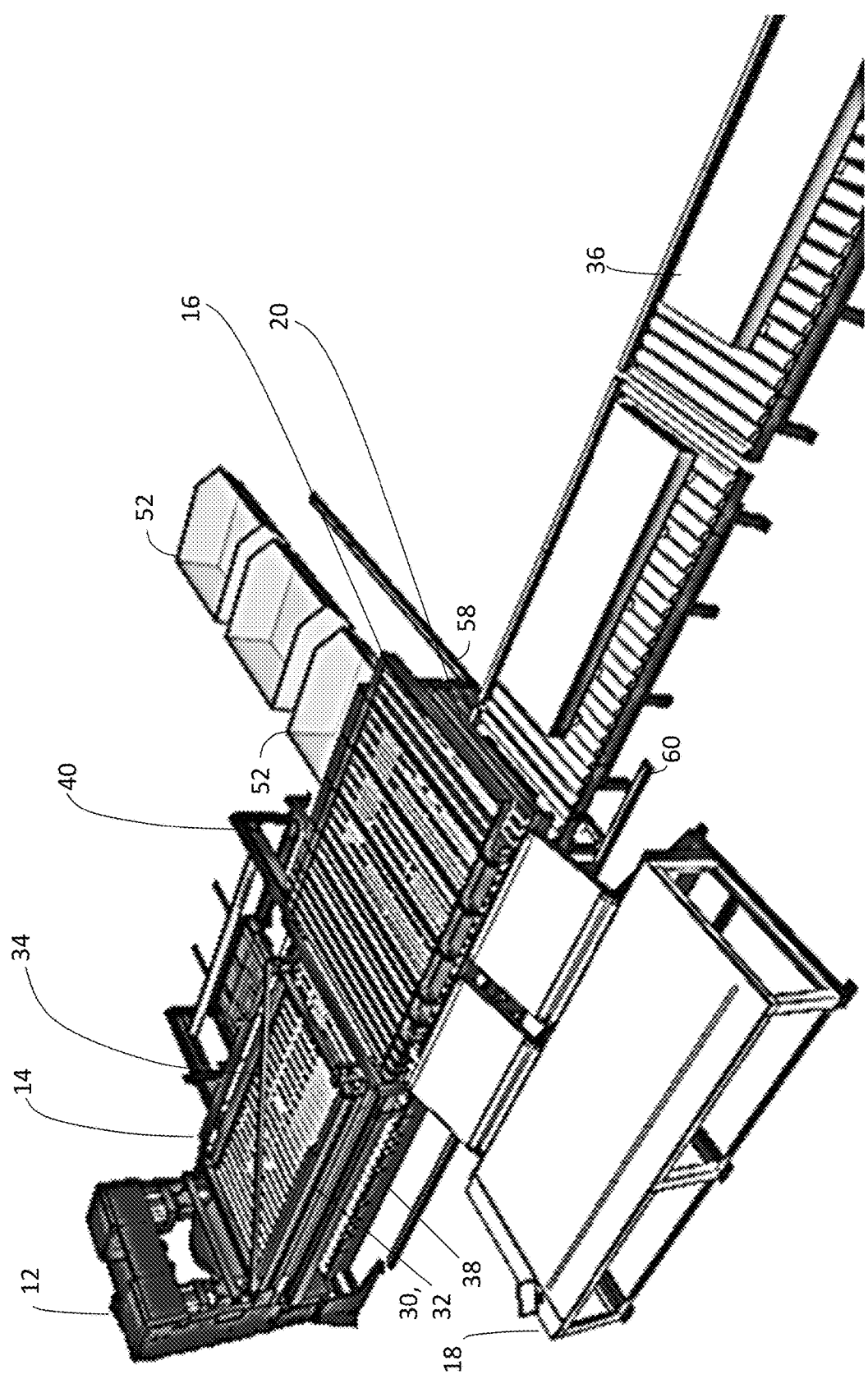
Figure 4:
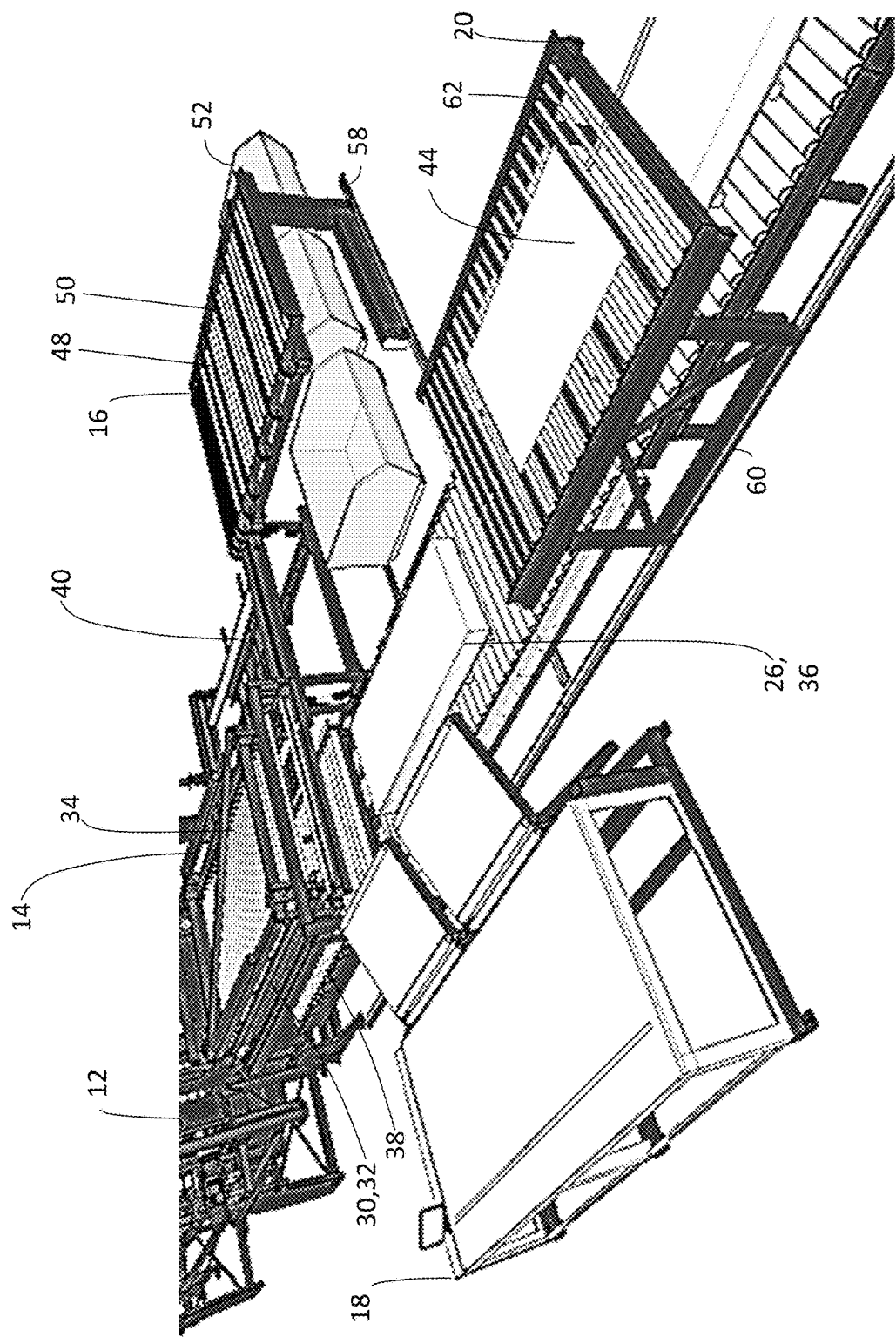
Figure 5:
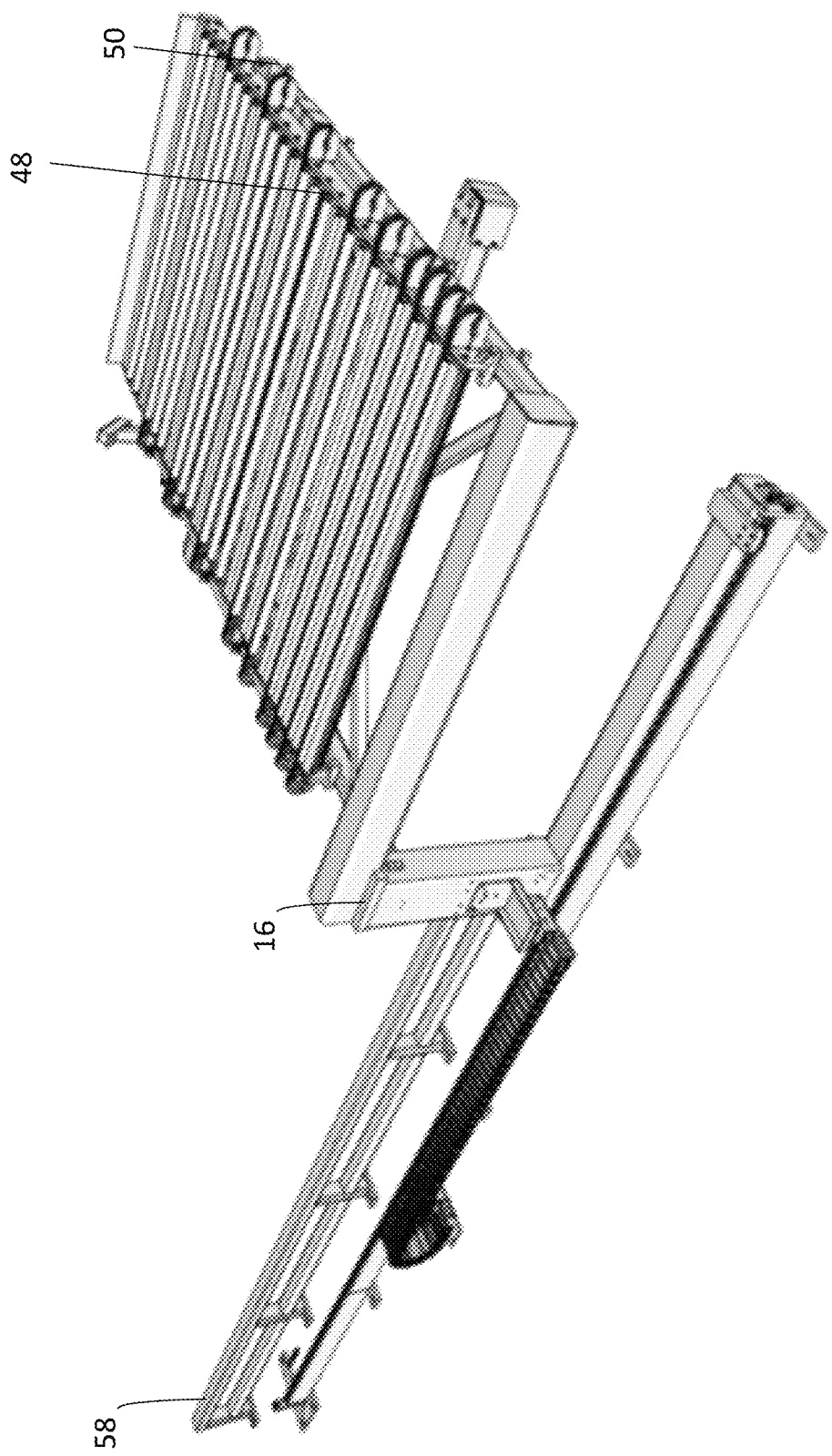
FIG. 5 is a perspective view of the traversing part sorter.
Figure 6:
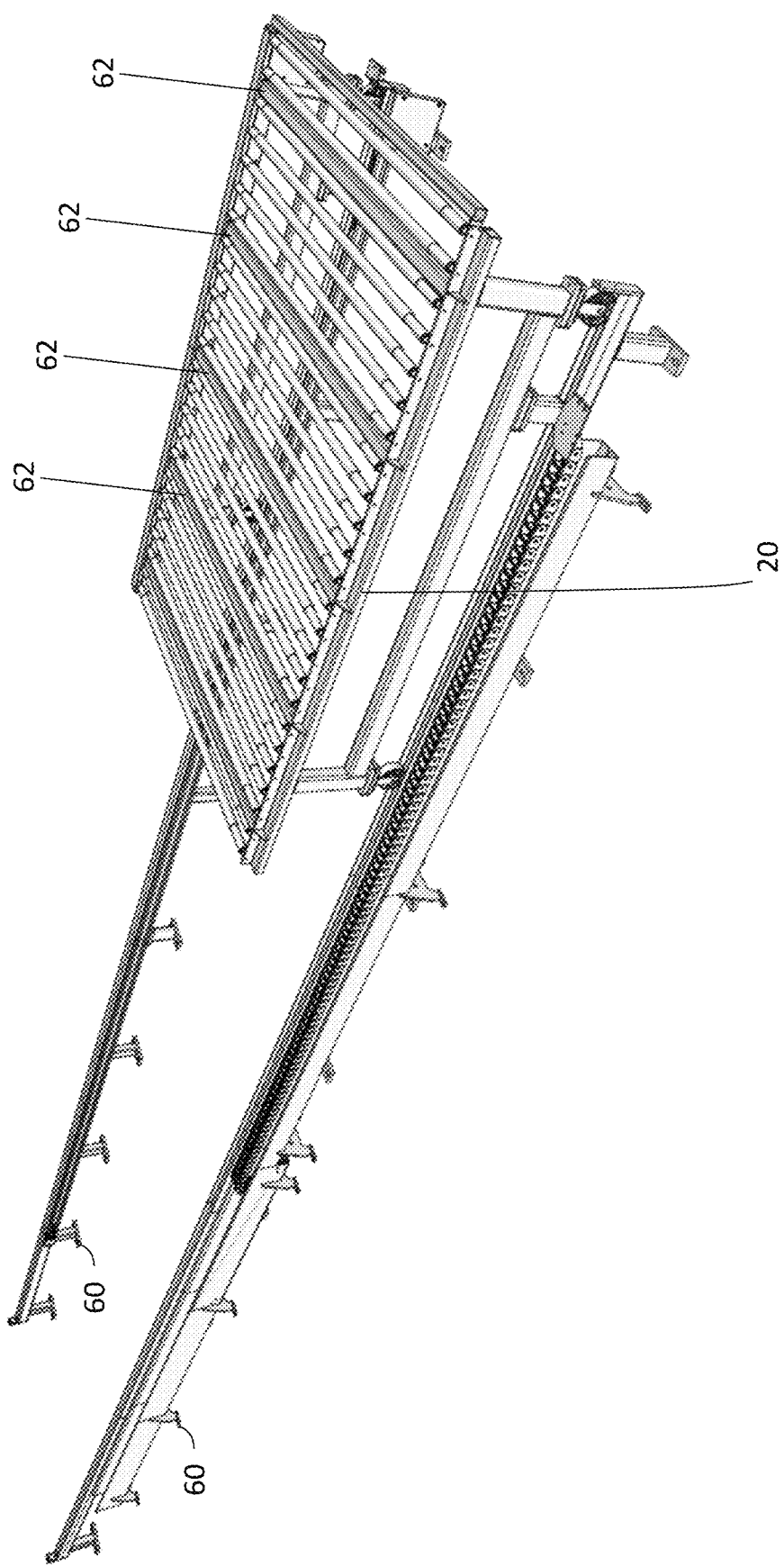
FIG. 6 is a perspective view of the part capture table.

FIGS. 1-4 show an exemplary sheet metal processing cell 10. The sheet metal processing cell 10 may have a shearer 12, a stacker 14, a traversing part sorter 16, a measuring table 18, a part capture table 20, and a part inverter 22. FIG. 5 shows the traversing part sorter in isolation. FIG. 6 shows the part capture table in isolation. Either one or both of the traversing part sorter and part capture table may be provided in the cell as desired. The cell may be incorporated into a coil unwinding, leveling, cut-to-length, and stacking processing line.

Stacker

The exemplary processing cell 10 include the stacker 14 and may include a shearer 12. In one aspect, the cell includes the stacker 14 that is adapted and configured to form a stack comprising a length of sheet metal 26. The stacker 14 is largely conventional and will be briefly described in order to provide context of the drawings and description that follows. The stacker 14 has an inlet that receives the length of sheet metal into the stacker, for instance, from an exit of the shearer 12, in a direction of advancement 28 through the processing cell. The stacker 14 may include a stack forming portion 30 with movable guides rails 32 that include a plurality of side rollers that engage the top and bottom surface of the length of sheet metal 26 on lateral sides of the sheet metal. Above the stacking forming portion 30, the stacker may have a diverter 34. The side rollers on the movable guide rails 32 may have centers spaced apart from one another across lateral sides of a movable guide rail 32. The side rollers project away from the movable guide 32 a short distance sufficient to support the weight of the sheet metal 26. As the length of sheet metal 26 enters the inlet of the stacker, the movable guide rails 32 move inward into position so the side rollers engage the top and bottom surfaces of the sheet on lateral sides of the sheet metal. Once the length of sheet metal is loaded in the stack forming portion, for instance, after the sheet metal is cut to length with the shearer 12 and the length in loaded in the stack forming portion, the moveable guide rails 32 may move outward allowing the side rollers to disengage from the bottom surface of the sheet metal 26 and allowing the sheet metal to fall into a stack 36. As the guide rails move inward to receive the subsequent sheet, aligning forms on the guide rails 32 may engage sides of the stack to ensure the newly entered length of sheet metal is aligned with lateral sides of the stack. Stops and aligning form may be provided in the stack forming portion 30 to assist in alignment of the sheet in the stack. The stack may be formed on an exit conveyor 38. The exit conveyor 38 may be configured to move vertically relative to the inlet conveyor 28. At the beginning of forming the stack, the exit conveyor 38 may move vertically upward to be in close proximity to the stack forming portion 30 and moveable guide rails 32 to limit the distance the sheet of metal drops from the side rollers of the moveable guide rails. As the stack 36 increases in height, the exit conveyor 38 may move downward and away from the inlet conveyor 28 and moveable guide rails 32. The stacks may be formed on a pallet resting on the exit conveyor. A pallet injector 40 may insert a pallet from a skid of pallets onto the exit conveyor 38 as needed. Once the stack 36 is formed on the exit conveyor 38, the exit conveyor may convey the stack out of the processing cell. The exit conveyor 38 may have a vertically moveable portion in the stacker 14 under the stack forming portion 30 and the guide rails 32, and a vertically fixed portion that extends out of the processing cell.

The diverter 34 is positioned above the stack forming portion 30 and guide rails 32 and may include a plurality of rollers that extend across the top frame of the stacker. When a length of sheet metal is to be diverted, the diverter 34 may move downward adjacent the inlet of the stacker, or the exit of the shearer, as applicable, to receive a diverted length of sheet metal. The diverter 34 may then convey the diverted length of sheet metal to the traversing part sorter 16.

Generally speaking, the exit conveyor 38 and the diverter 34 of the stacker 14 are configured to convey the sheet metal 26 or stack of sheet metal 36 as applicable in the same direction, which is termed the direction of advancement 28 herein. When provided in the processing cell 10, the traversing part sorter 16 may be arranged downstream in the direction of advancement 28 to the diverter 34 so as to cooperate with the diverter to receive any diverted length of sheet metal 42. When provided in the processing cell 10, the part capture table 20 may be movable along an axis parallel to the direction of advancement to handle any captured length of sheet metal 44.

Traversing Part Sorter

The traversing part sorter 16 when provided is preferably arranged to be downstream of the diverter 34 and cooperate with the diverter to receive the diverted length of sheet metal 42. The traversing part sorter 16 may be suspended above the exit conveyor 38 of the stacker 14, and may be cantileverly supported above the exit conveyor to provide a compact foot print for the processing cell. The traversing part sorter 16 may have a conveyor system 48,50 adapted to move the diverted length of sheet metal away from the diverted. The conveyor system may comprise a traversing part sorter first conveyer 48 and a traversing part sorter second conveyor 50. When the diverter 34 of the stacker receives a diverted length of sheet metal and conveys it to the traversing part sorter, the first conveyor 48 and second conveyor 50 may be configured to convey the diverted length of sheet metal to a scrap bin 52 and/or part measuring table 18. The traversing part sorter first conveyor 48 may convey the diverted sheet away from the diverter 34 of the stacker in a first direction 54, which may be parallel to the direction of advancement 28, or another direction depending upon the layout of the processing cell 10, processing line and/or facility. The traversing part sorter second conveyor 50 may be configured to convey the diverted length of sheet metal 42 from the diverter 34 in a direction different 56 from the first direction 54. As shown in the drawings, the traversing part sorter second conveyor 50 is arranged so that diverted sheet metal is moved in a direction perpendicular to the first direction 54 which may also be perpendicular to the direction of advancement. Depending upon the layout of the processing cell 10, processing line, and/or the facility, the conveyors 48,50 of the conveyor system on the traversing part sorter 16 may be arranged to convey the diverted sheet metal in a direction as needed away from the diverter 34. The traversing part sorter first conveyor 48 may comprise rollers, all or some of which may be passive. The traversing part sorter second conveyor 50 may comprise a plurality of belts. The belts may be high traction belts and may be interdigitated with some of the rollers 48 of the traversing part sorter first conveyor so that upon activation of the traversing part sorter second conveyor, the second conveyor may rise above the rollers and engage the diverted length of sheet metal and move it relative to the first conveyor.

Figure 7:
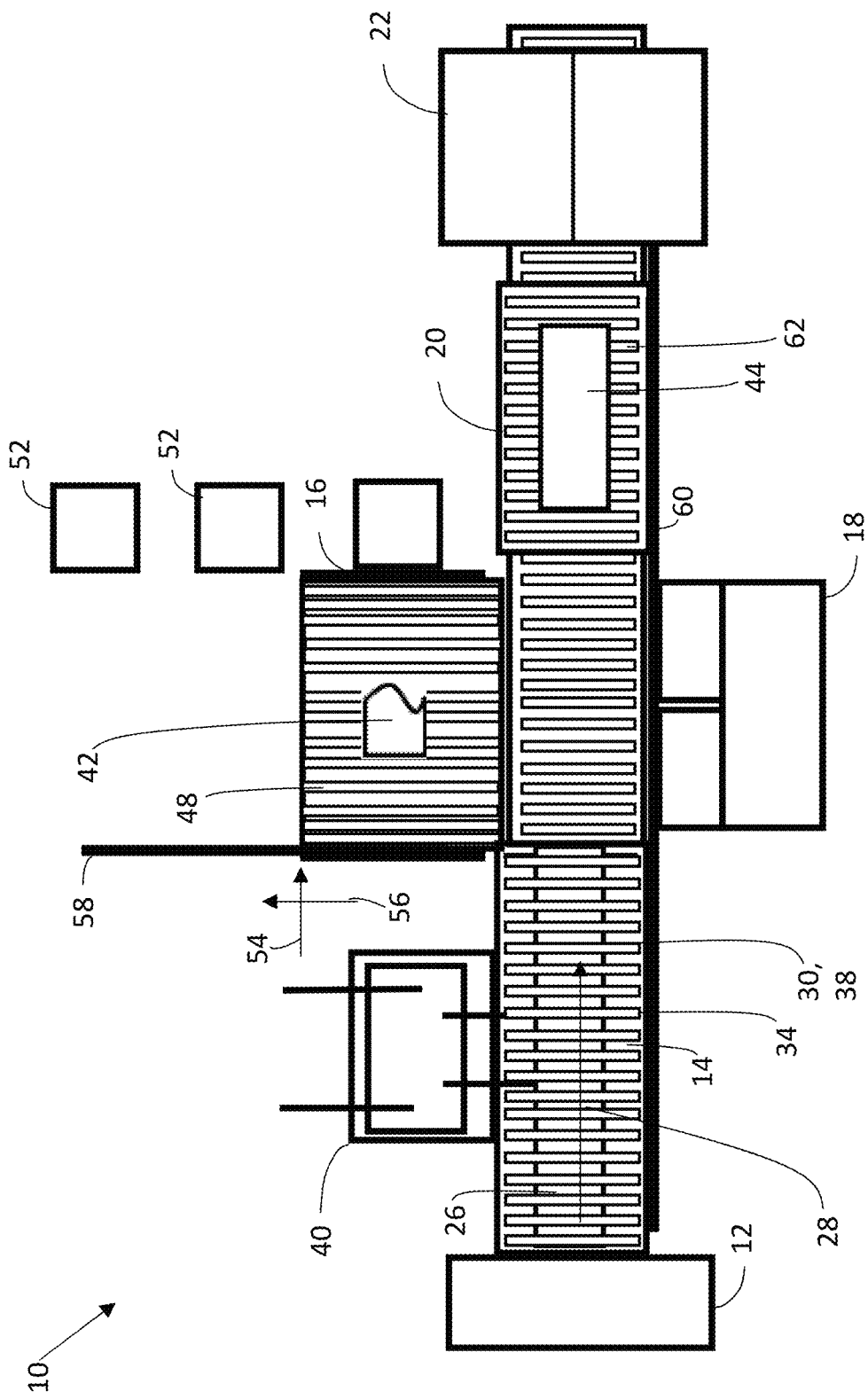
FIG. 7 is a schematic top view of another embodiment of the processing line with a shearer, stacker, traversing part sorter and part capture table.

The traversing part sorter second conveyor 50 may be configured to move in both directions (forward and reverse). So, when the processing line 10 is configured with a single scrap bin 52 adjacent to the traversing part sorter 16, the traversing part sorter second conveyor 50 may convey the diverted length of sheet metal 42 received from the diverter into the scrap bin, and may convey the diverted length of sheet metal off a lateral edge of the traversing part sorter into the adjacent scrap bin. When using the second conveyor 50 to direct the diverted length of sheet metal to the scrap bin, the lateral edge may be parallel to the direction of advancement. The first conveyor 48 may also be used to convey the direct the diverted length of sheet metal to the scrap bin for instance when the scrap bin is laterally aligned in a direction parallel to the direction of advancement 28, for instance, as shown in FIG. 7. In this case, the first conveyor may convey the diverted length of sheet metal into the adjacent scrap off a lateral edge of the traversing part sorter that is perpendicular to the direction of advancement. This configuration may also dispense with the need for a second conveyor, although the second conveyor may still be desirable to allow for alignment without movement of the traversing part sorter. When the processing line is configured with a part measuring table 18 adjacent to the traversing part sorter 16, the second conveyor may be adapted and configured to convey the diverted length of sheet metal 42 in the opposite direction onto the part measuring table. It is not necessary that the processing line be configured with both a scrap bin and part measuring table. The traversing part sorter may be configured to work with either or both a scrap bin and part measuring table. The traversing part sorter may be configured to convey the diverted length of sheet metal received from the stacker inlet conveyor into the scrap bin and/or the part measuring table independent of the stacker forming the stack comprising the length of sheet metal.

Further, the traversing part sorter 16 is preferably configured to be movable relative to the diverter 34, although depending on the plant layout, this option may not be needed with a single scrap bin and/or part measuring table. As shown in the drawings, the diverted table may be movable between a receiving position and a plurality of diverting positions. When in the receiving position, the traversing part sorter 16 is aligned with the diverter 34 of the stacker in a manner so as to receive the diverted length of sheet metal 42 from the diverter. When in any one of the plurality of diverting positions, the traversing part sorter 16 may be away from and out of alignment with the diverter 34. Each diverting position in the plurality of diverting positions may be adjacent to a respective scrap bin 52. Each scrap bin 52 may correspond to a type of material comprising the length of sheet metal and/or a scrap bin may be designated as an overflow scrap bin in the event a primary scrap bin becomes full. The traversing part sorter 16 may be movable between the receiving position and the plurality of diverting positions on rail system 58. The rail system 58 may extend under the exit conveyor 38 so with a cantilever arrangement of the traversing part sorter 16, the traversing part sorter has a full range of motion at the receiving position in line with the diverter and any measuring table. The traversing part sorter 16 may be configured to move between the receiving position and the plurality of diverting positions independent of the stacker forming the stack comprising the length of sheet metal.

Several aspects of a method may also be provided in connection with the processing cell including the traversing part sorter described above. One aspect is a method of processing a length of sheet metal in a sheet metal processing cell comprising a stacker. The method includes: (a) directing the length of sheet metal 26 into an inlet of the stacker 14 in a direction of advancement 28; (b) moving a diverter of the stacker to a position to receive the length of sheet metal from the inlet, (c) with the diverter, conveying the diverted length of sheet metal from the inlet of the stacker; (c) receiving the diverted length of sheet metal 42 on a traversing part sorter 16 arranged downstream of the diverter; (d) with a conveyor system of the traversing part sorter, conveying the diverted length of sheet metal away from the stacker inlet conveyor.

In connection with the above method, the step of conveying the diverted length of sheet metal 42 away from the diverter 34 may include conveying in the first direction 54 with the first conveyor 50 which may comprises conveying the diverted length of the sheet metal in the direction of advancement 28.

In connection with the above method, the step of conveying the diverted length of sheet metal 42 away from the diverter may include conveying in the second direction 56 with the second conveyor 50, which may comprises conveying the diverted length of the sheet metal in a direction transverse to the first direction of the traversing part sorter first conveyor.

Another aspect of the method further comprises cutting the sheet metal to the length with a shearer 12 arranged upstream of the inlet of the stacker.

Another aspect of the method further comprises conveying the diverted length of sheet metal 42 on into a scrap bin 52 adjacent to the traversing part sorter 16.

Another aspect of the method further comprises conveying the diverted length of sheet metal 42 a scrap bin corresponding to a type of material.

Another aspect of the method further comprises conveying the diverted length of sheet metal 42 off a lateral edge of the traversing part sorter 16 that is parallel to the direction of advancement.

Another aspect of the method further comprises conveying the diverted length of sheet metal 42 off a lateral edge of the traversing part sorter 16 that is perpendicular to the direction of advancement.

Another aspect of the method further comprises conveying the diverted length of sheet metal 42 on the traversing part sorter independently of the stacker 14 forming the stack 36 comprising the length of sheet metal 26.

Another aspect of the method further comprises moving the traversing part sorter 16 relative to the diverter 34 of the stacker 14 between a receiving position and a plurality of diverting positions, such that when the traversing part sorter is in the receiving position, the traversing part sorter is aligned with the diverter of the stacker in a manner so as to receive the diverted length of sheet metal 42 from the diverter of the stacker; and when the traversing part sorter in any one of the plurality of diverting positions, the traversing part sorter is away from and out of alignment with the diverter of the stacker.

Another aspect of the method further comprises moving the traversing part sorter 16 between the receiving position and the plurality of diverting positions on a rail system 58.

Another aspect of the method further comprises moving the traversing part sorter 16 between the receiving position and the plurality of diverting positions independently of the stacker forming the stack 36 comprising the length of sheet metal 26.

Another aspect of the method further comprises moving the traversing part sorter 16 between the receiving position and the plurality of diverting positions in a direction transverse to the direction of advancement 28.

Another aspect of the method further comprises conveying the diverted length of sheet metal 42 on the traversing part sorter to a part measuring table 18.

Part Capture Table

The part capture table 20 when provided is configured to be movable between an inserted position and withdrawn area. When the part capture table is in the inserted position, the part capture table is positioned within a frame structure of the stacker 14 below the stack forming portion 30 and above the exit conveyor 28. When the part capture table 20 is in the withdrawn area, the part capture table is positioned outside of the frame structure of the stacker 14. The part capture table 20 may be suspended above the exit conveyor 38 of the stacker to provide a compact foot print for the processing cell. When the traversing part sorter 16 is in the receiving position, the part capture table 20 may in a position in the withdrawn area that is below the traversing part sorter 16 and above the exit conveyor 38 of the stacker 14. The part capture table may movable to several positions in the withdrawn area to allow the captured length of sheet metal 44 received on the part capture table to be inspected at a position clear of the traversing part sorter 16. The part capture table 20 may be movable between the inserted position and the withdrawn area on a rail system 60. The rail system may be parallel to the exit conveyor.

To capture a part 44 on the part capture table 20, the stack forming portion 30 may engage the length of sheet metal 26 as it normally would when positioning the length of the sheet of metal to be received in the stack 36 when the stacker forms the stack with the length of sheet metal. The part capture table 20 may be moved to the inserted position to receive a captured length of sheet metal from the inlet conveyor. The movable guide rails may then move outward so as to allow the length of sheet metal to be received (i.e., dropped) on the part capture table. With the captured length of sheet metal 44 on the part capture table 20, the part capture table may be moved to the withdrawn area. While the part capture table 20 is in the withdrawn area, stacking operations and forming a stack 36 comprising the length of sheet metal 26 may resume in the stacker 14.

The part capture table 20 may also be configured to transfer the captured length of sheet metal 44 from the part capture table back to the stack after inspection. In that regard, the part capture 20 table may comprise a conveyor 62 adapted and configured to convey the captured length of the sheet metal 44 off the part capture table onto the stack 36 when the part capture table is in the inserted position. More specifically, when the part capture table 20 is in the inserted position, the part capture table conveyor 62 may convey the captured length of sheet metal 44 off the part capture table onto the stack 36 with the captured length of sheet metal engaging a face in a upstream area of the processing cell 10 as the part capture table moves toward the withdrawn area. In this way the captured length of sheet metal 44 may be maintained in alignment with the stack 36 as the captured length of sheet metal is returned to the stack. If a shearer 12 is provided in the processing cell 10 upstream of the stacker 14, the part capture table conveyor 62 may convey the captured length of sheet metal 44 off the part capture table onto the stack 36 with the captured length of sheet metal engaging a face of the shearer. The part capture table conveyor 62 may comprise powered rollers adapted and configured for conveying the captured length of the sheet metal 44 off the part capture table 20 onto the stack 36 when the part capture table is in the inserted position.

The sheet metal processing 10 cell may further include the part inverter 22. The part inverter 22 may cooperate with the part capture table 20 when the part capture table is in the withdrawn area and allow operators to invert the capture length of sheet metal for inspection. The part inverter is conventional and may include a vacuum part inverter or a mechanical part inverter/flipper.

In the description above, the principle and embodiments of the present application are illustrated herein by specific examples. The description of the above embodiments is only intended to facilitate the understanding of the method and the concept of the present application. For those skilled in the art, changes can be made to specific embodiments and an application scope of the present application, according to the concepts of the application. In conclusion, contents of the specification should not be construed as limitation to the present application.

What is claimed is:

1. A sheet metal processing cell comprising:
    (i) a stacker, the stacker being adapted and configured to form a stack comprising a length of sheet metal, the stacker comprising:
       an inlet through which the length of sheet metal is receiving in a direction of advancement through the processing cell;
       a stack forming portion adapted and configured to move adjacent the inlet and receive the length of sheet metal and place the length of sheet metal in a stack;
       an exit conveyor on which the stack comprising the length of sheet is positioned when forming the stack, the exit conveyor being adapted to convey the stack out of the stacker, the exit conveyor of the stacker being vertically below the stacker forming portion; and
    (ii) a part capture table, the part capture table being movable between an inserted position and withdrawn area relative to the stacker, wherein when the part capture table is in the inserted position, the part capture table is positioned within a frame structure of the stacker below the stack forming portion and above the exit conveyor, wherein when the part capture table is in the withdrawn area, the part capture table is positioned outside of the frame structure of the stacker, when the part capture table is in the inserted position, the part capture table is configured to at least one of receive a captured length of sheet metal from the stack forming portion and transfer the captured length of sheet metal from the part capture table to the stack comprising the length of sheet metal positioned on the exit conveyor, the part capture table comprising a conveyor adapted and configured to convey the captured length of the sheet metal off the part capture table onto the stack when the part capture table is in the inserted position.

2. The sheet metal processing cell of claim 1, wherein the processing cell includes a face at an upstream end of the stacker; and wherein when the part capture table is in the inserted position with the conveyor of the part capture table conveying the captured length of sheet metal off the part capture table onto the stack, the part capture table is configured to move toward the withdrawn area with the captured length of sheet metal engaging against the face.

3. The sheet metal processing cell of claim 2, wherein the processing cell includes a shearer arranged upstream of the stacker for cutting the sheet metal to the length; and wherein when the part capture table conveyor is conveying the captured length of sheet metal off the part capture table onto the stack, the part capture table conveyor is conveying the captured length of sheet metal so as to engage against the face of the shearer as the part capture table is moving to the withdrawn area.

4. The sheet metal processing cell of claim 1 wherein the conveyor of the part capture table comprises powered rollers adapted and configured for conveying the captured length of the sheet metal off the part capture table onto the stack when the part capture table is in the inserted position.

5. The sheet metal processing cell of claim 1 wherein the part capture table is movable along axis parallel to the direction of advancement when moving between the inserted position and the withdrawn area.

6. The sheet metal processing cell of claim 1, wherein the part capture table is movable between the inserted position and the withdrawn area on a rail system.

7. The sheet metal processing cell of claim 6, wherein the rail system is parallel to the exit conveyor.

8. The sheet metal processing cell of claim 1, wherein the part capture table is movable between the inserted position and the withdrawn area above the exit conveyor.

9. The sheet metal processing cell of claim 1, further comprising a part inverter, the part inverter cooperating with the part capture table when the part capture table is in the withdrawn area, the part inverter being adapted and configured to invert the capture length of sheet metal.

10. The sheet metal processing cell of claim 1, wherein the part capture table is adapted and configured to move within the withdrawn area independent of the stacker forming the stack comprising the length of sheet metal.

11. A method of processing a length sheet metal in a sheet metal processing cell, wherein the sheet metal processing cell comprises: (i) a stacker for forming a stack comprising the length of sheet metal, and (ii) a part capture table wherein the part capture table is movable between an inserted position and withdrawn area relative to the stacker, wherein when the part capture table is in the inserted position, the part capture table is positioned within a frame structure of the stacker below a stack forming portion of the stacker and above an exit conveyor of the stacker, wherein when the part capture table is in the withdrawn area, the part capture table is positioned outside of the frame structure of the stacker, the method comprising:

directing the length of sheet metal through an inlet of the stacker in a direction of advancement;

moving the stack forming portion of the stacker adjacent the inlet of the stacker to receive the length of sheet metal and to position the length of the sheet of metal in a manner to be received in the stack;

moving the part capture table to the inserted position within the frame structure of the stacker in a manner where the part capture table is below the stack forming portion and above the exit conveyor of the stacker on which the stack comprising the length of sheet is positioned when forming the stack;

disengaging the length of sheet metal from the stack forming portion in a manner so as to allow the length of sheet metal to be received on the part capture table;

with the captured length of sheet metal on the part capture table, moving the part capture table to the withdrawn area;

moving the part capture table from the withdrawn area to the inserted position with the with the captured length of sheet metal on the part capture table; and once in the inserted position, with a conveyor of the part capture table, conveying the captured length of sheet metal from the part capture table to the stack.

12. The method of claim 11, wherein the step of conveying the captured length of sheet metal from the part capture table to the stack comprises:

conveying the captured length of sheet metal off the part capture table onto the stack while moving the part capture table to the withdrawn area with the captured length of sheet metal engaging against the face at an upstream end of the stacker.

13. The method of claim 12, wherein the step of conveying the captured length of sheet metal off the part capture table onto the stack while moving the part capture table to the withdrawn area with the captured length of sheet metal engaging against the face comprises:

engaging against the face of a shearer arranged upstream of the stacker for cutting the sheet metal to the length in the processing cell.

14. The method of claim 11, wherein the step of conveying the captured length of sheet metal from the part capture table to the stack comprises conveying the captured length of the sheet metal off the part capture table onto the stack with powered rollers.

15. The method of claim 11 further comprising inspecting the captured length of sheet metal processing when the part capture table is moved to the withdrawn area.

16. The method of claim 15 further comprising inverting the captured length of sheet metal with a part inverter cooperating with the part capture table.

17. The method of claim 11, further comprising forming the stack with a further length of sheet metal in the stacker with the part capture table in the withdrawn area.

18. The method of claim 11, further comprising moving the part capture table between the inserted position and the withdrawn area on a rail system.

19. The method of claim 11, further comprising moving the part capture table between the inserted position and the withdrawn area above the exit conveyor.

20. The method of claim 11, further comprising moving the part capture table between the inserted position and the withdrawn area along axis parallel to the direction of advancement.

* * * * *